April 4, 1939.　　　　C. N. WINDECKER　　　　2,153,112
CLINKER COOLER
Filed April 21, 1938　　　　8 Sheets-Sheet 1

INVENTOR.
C. N. Windecker
BY William H. Brown
ATTORNEY.

April 4, 1939. C. N. WINDECKER 2,153,112
CLINKER COOLER
Filed April 21, 1938 8 Sheets-Sheet 4

INVENTOR.
C N Windecker
BY William H Brown
ATTORNEY.

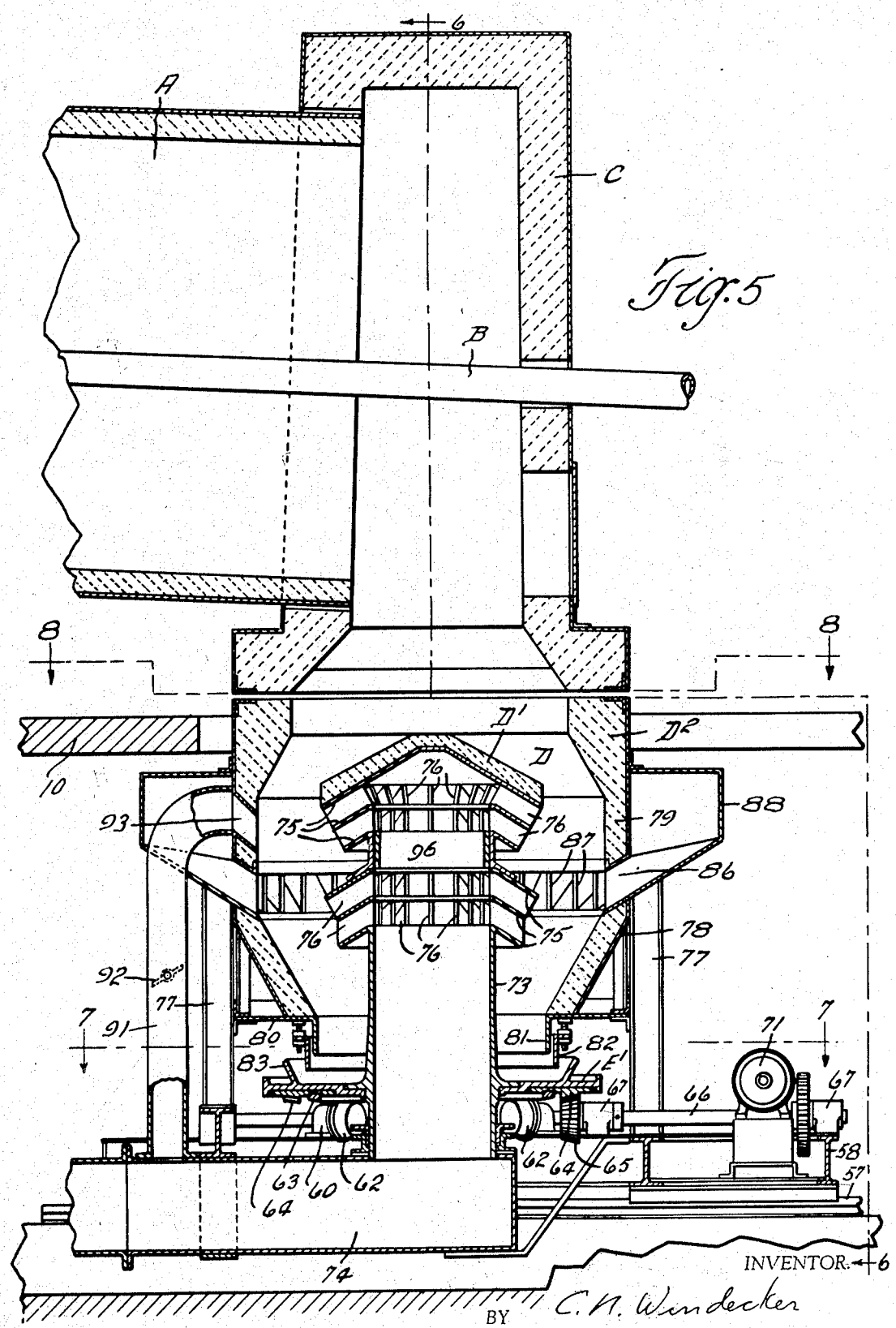

April 4, 1939.  C. N. WINDECKER  2,153,112
CLINKER COOLER
Filed April 21, 1938    8 Sheets-Sheet 6
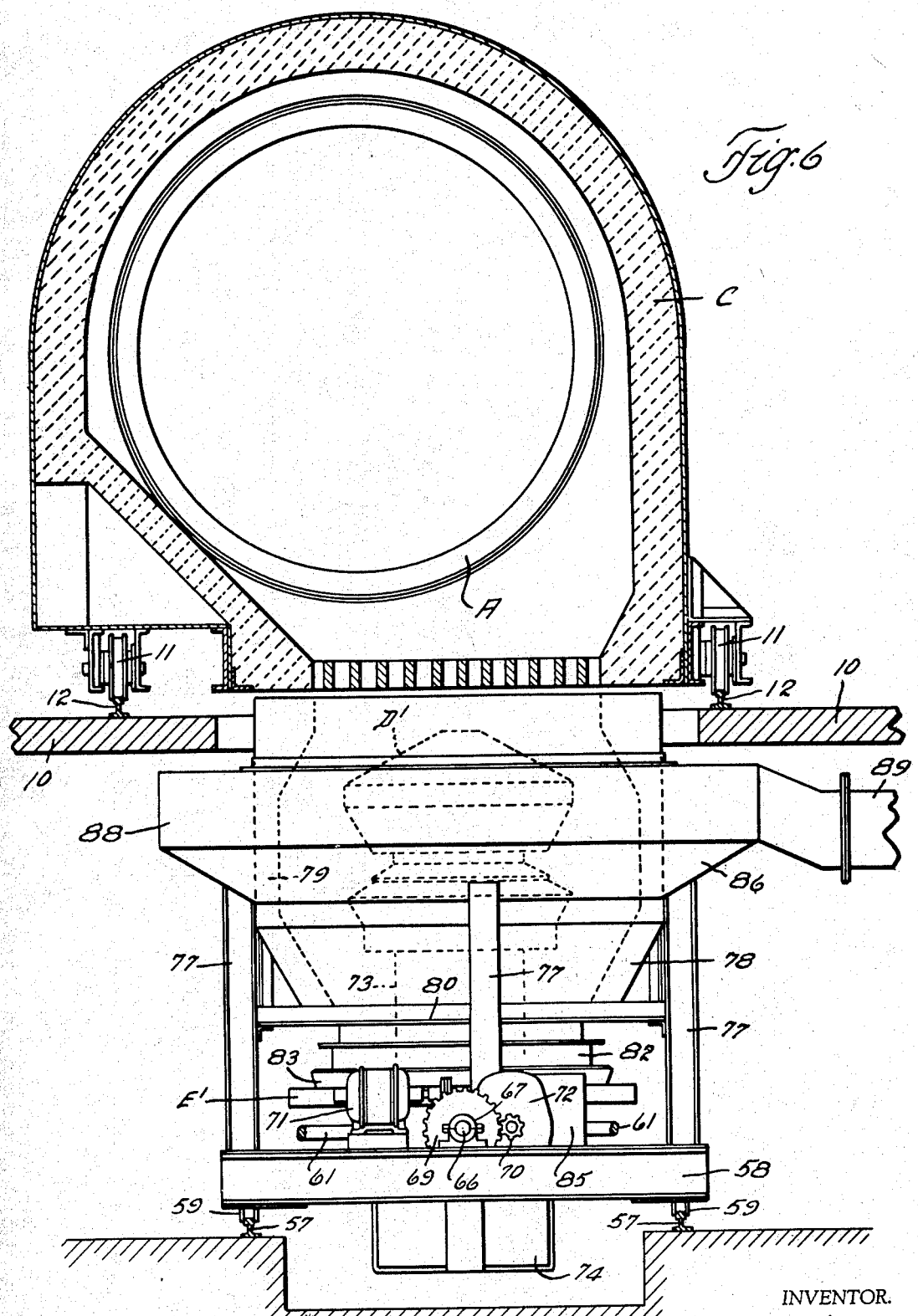
INVENTOR.
C N Windecker
BY William H Brown
ATTORNEY.

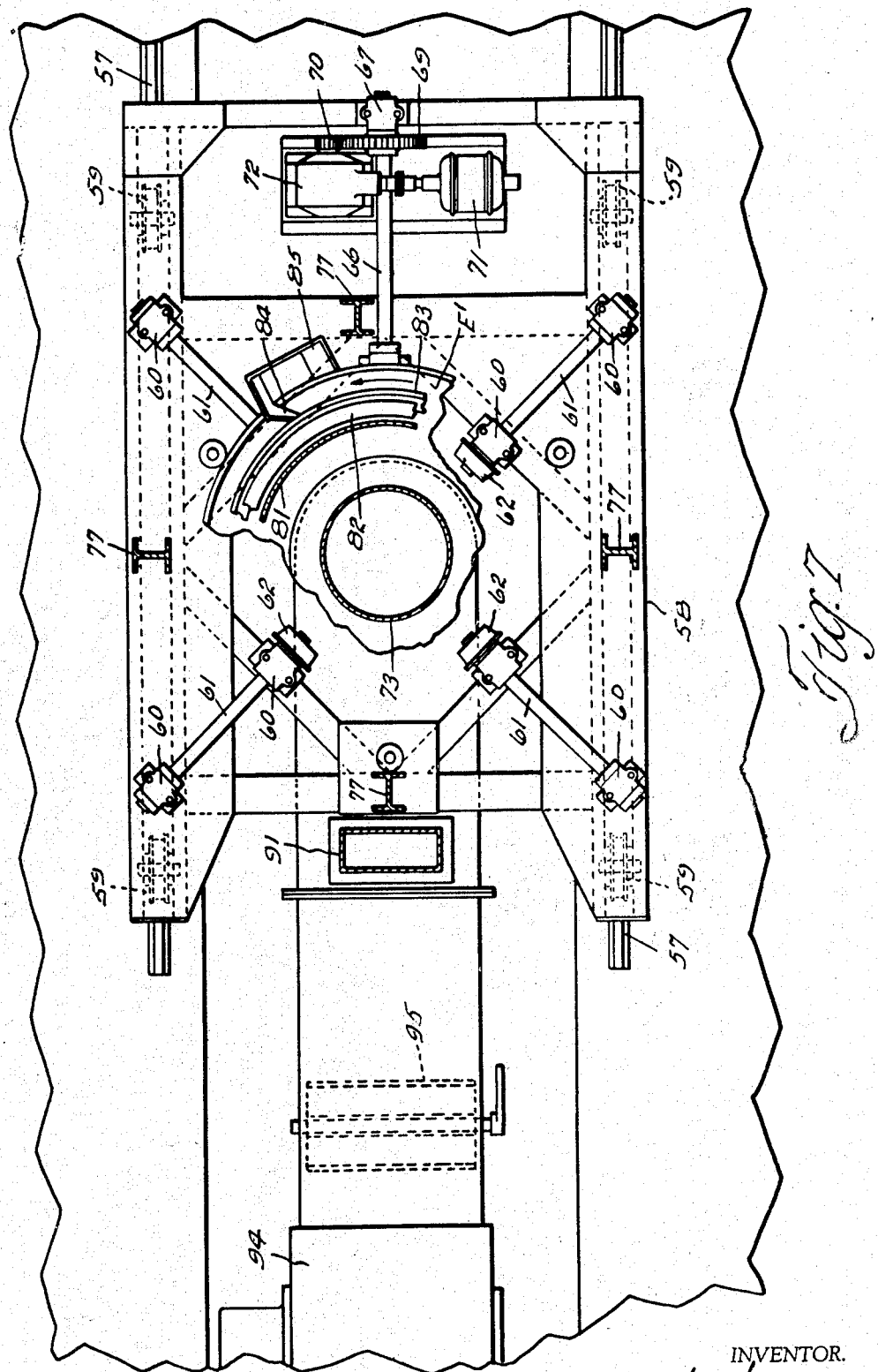

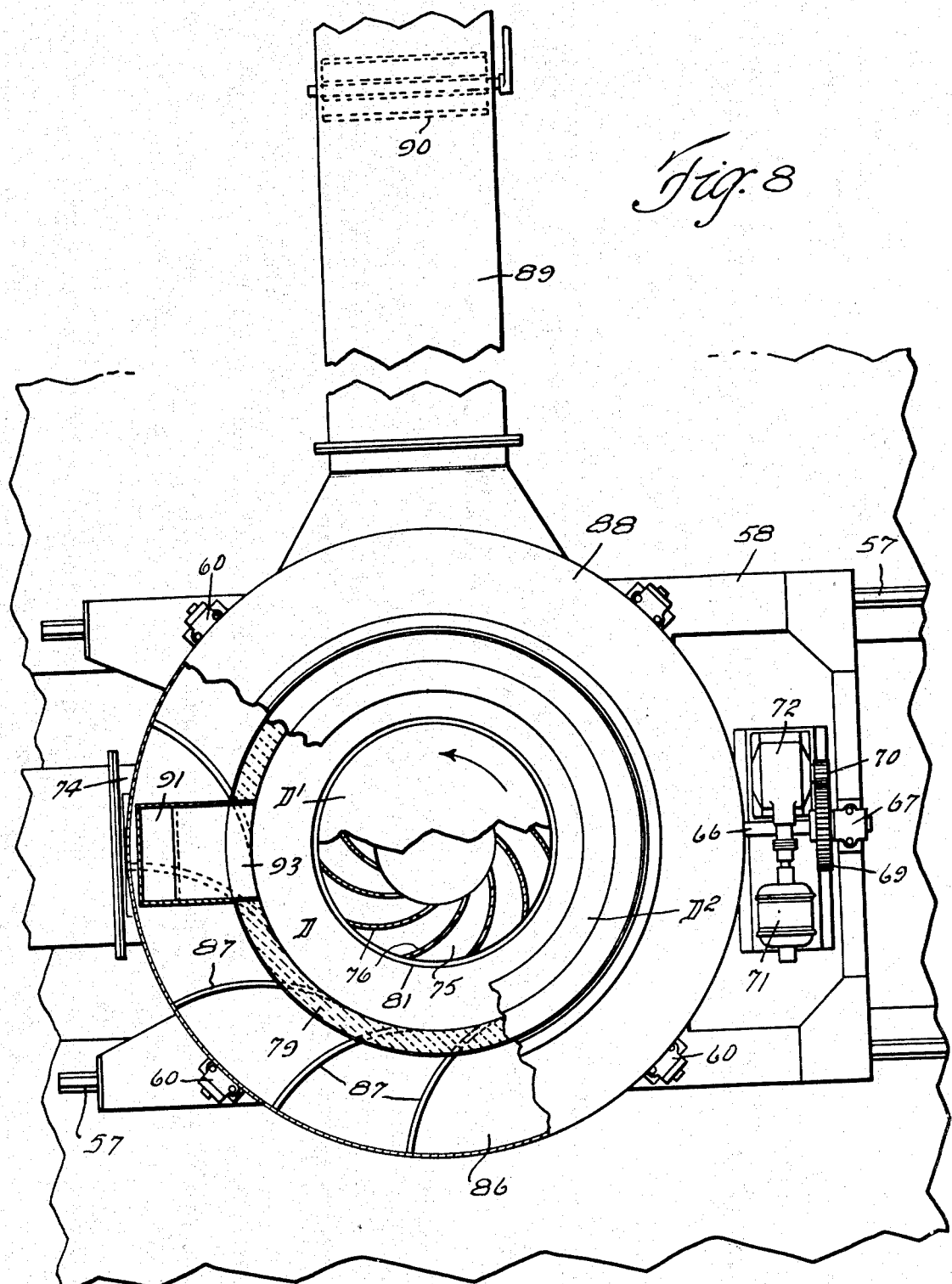

Patented Apr. 4, 1939

2,153,112

UNITED STATES PATENT OFFICE 2,153,112

CLINKER COOLER

Clifton N. Windecker, Painesville, Ohio; Robert Erwin Windecker, Irene W. Alonso and Charles Edward Windecker, executors of estate of said Clifton N. Windecker, deceased Application April 21, 1938, Serial No. 203,429

18 Claims. (Cl. 263—53)

This invention relates to a cooling device, which, while useful in other relations, will be described with particular reference to its use in cement manufacturing equipment.

In this art, a conventional procedure includes feeding a suitable mixture into a rotary kiln of the internally fired variety and there heating it sufficiently to effect the desired chemical and physical changes. The material is discharged from the kiln in masses known in the art as "clinkers". In common practice, these clinkers are discharged from the kiln at a temperature of the order of 2000 to 2400 degrees F. and it is desirable that they be cooled to a black color, a temperature of about 1000 degrees F. as fast as possible by air cooling. Rapid cooling not only improves the final product but also produces internal stresses in the cooled clinkers which greatly facilitate subsequent grinding.

Accordingly, it is the object of the invention, broadly stated, to provide superior mechanism, adapted to be associated with a conventional rotary kiln, for rapidly cooling the clinkers discharged therefrom, primarily down to the black charged color and advantageously also to a suitable temperature for grinding before discharge from the cooling mechanism. A further object is the provision of means for effecting important economies in fuel by the provision of superior mechanism for causing that portion of the cooling air which can be utilized in the kiln as secondary air to be delivered thereto at a high temperature and the remainder to be delivered elsewhere at a relatively low temperature.

Among the more limited objects are: low first cost, durability, superior means for controlling the flow of air, compactness of construction, ready access to the vital parts for making repairs, maintenance of a uniform clinker bed in the zone where most rapid cooling takes place, provision of new and improved means for introduction of the cooling air to the clinker bed and removal of a portion of such air therefrom, and the location of heat vulnerable mechanism including the air proportioning means at a distance from the high temperature zone.

Figure 1:
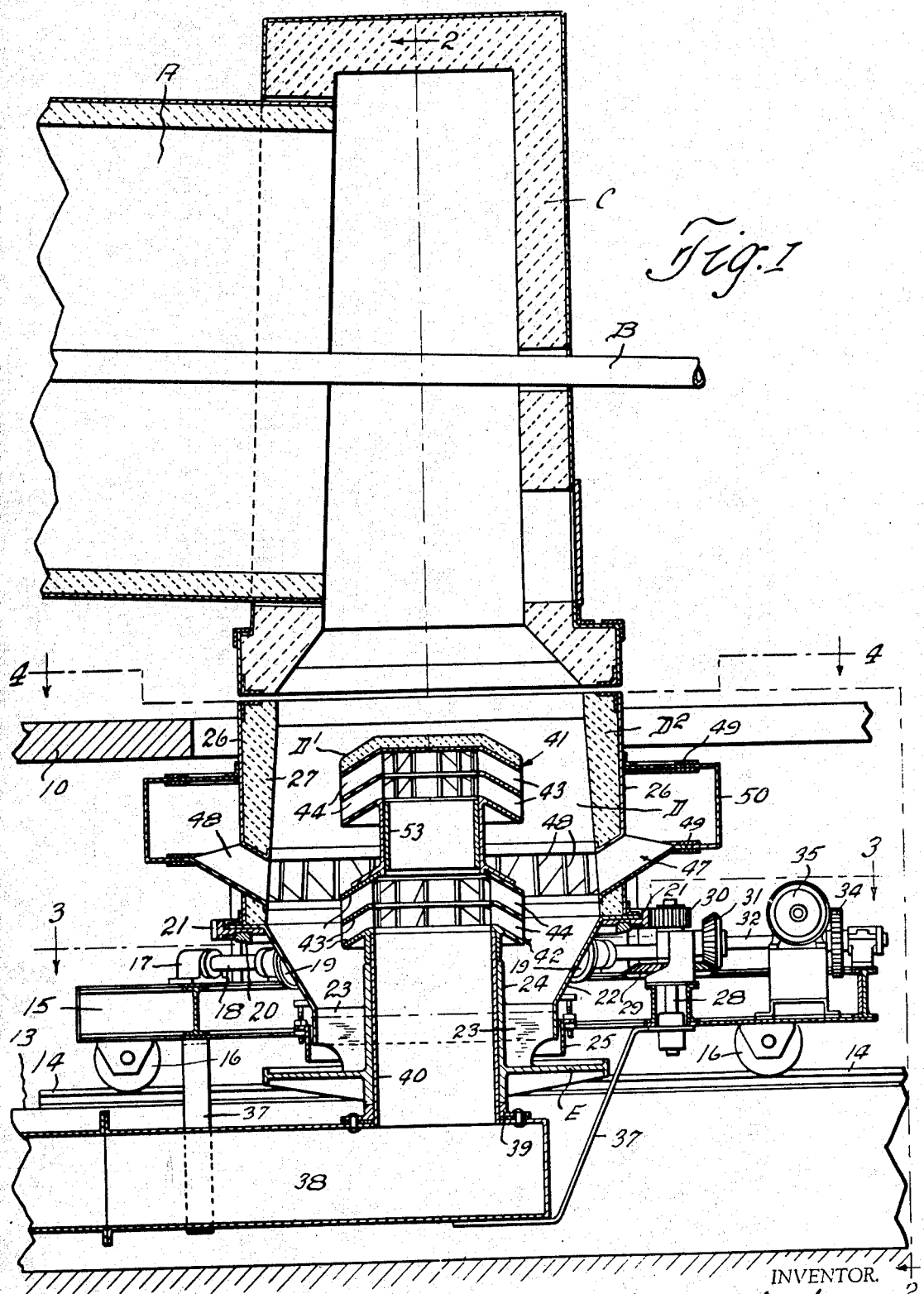
Figure 2:
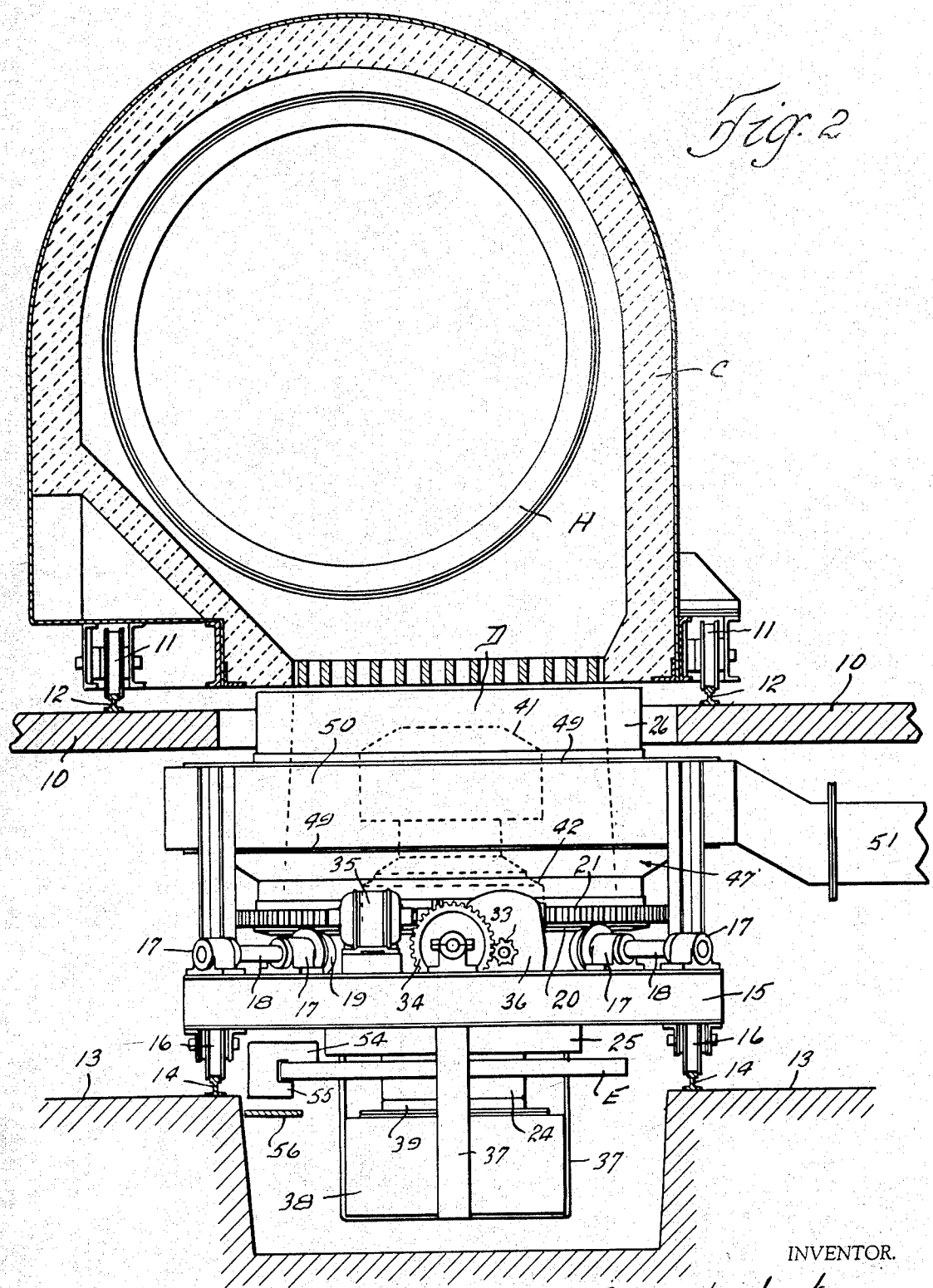
Figure 3:
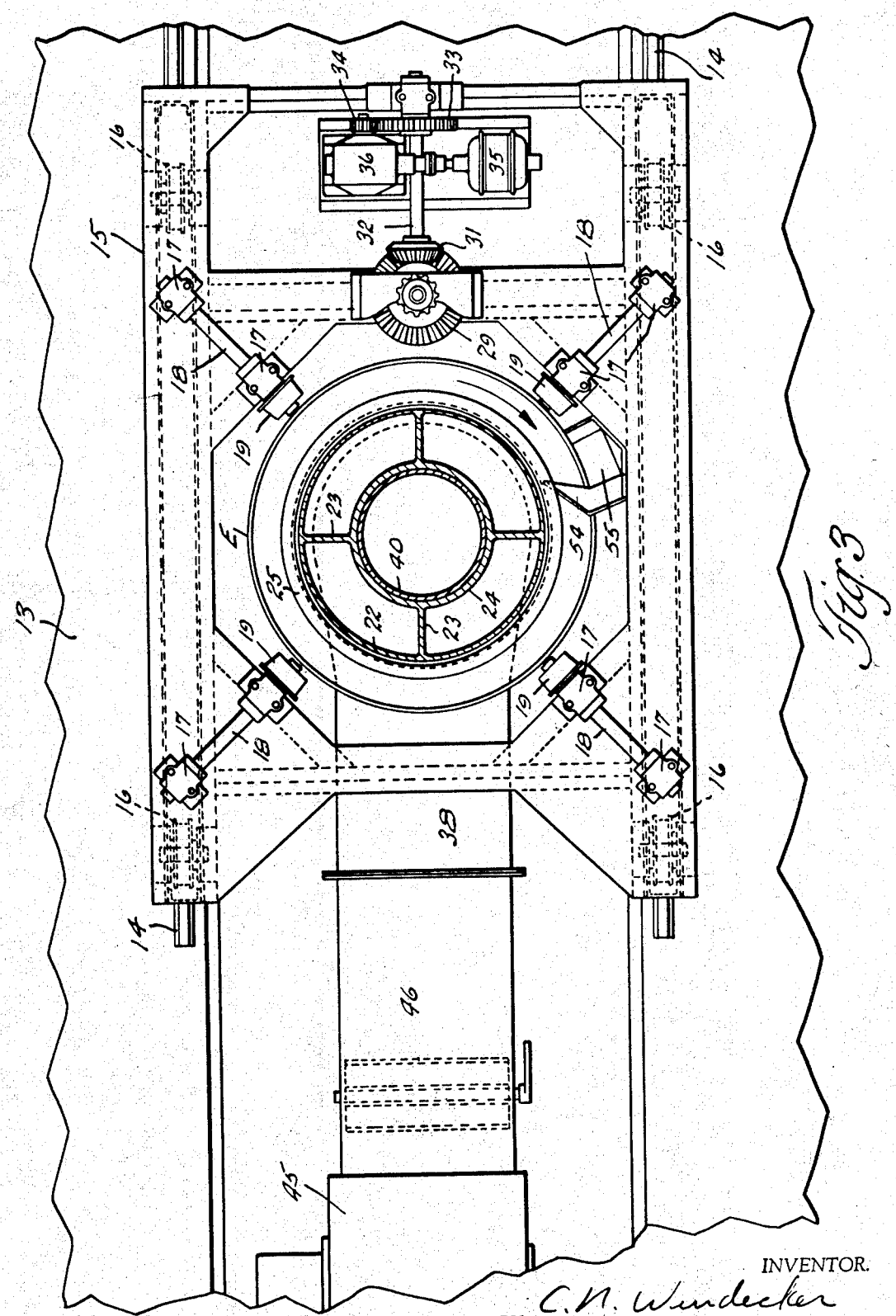
Figure 4:
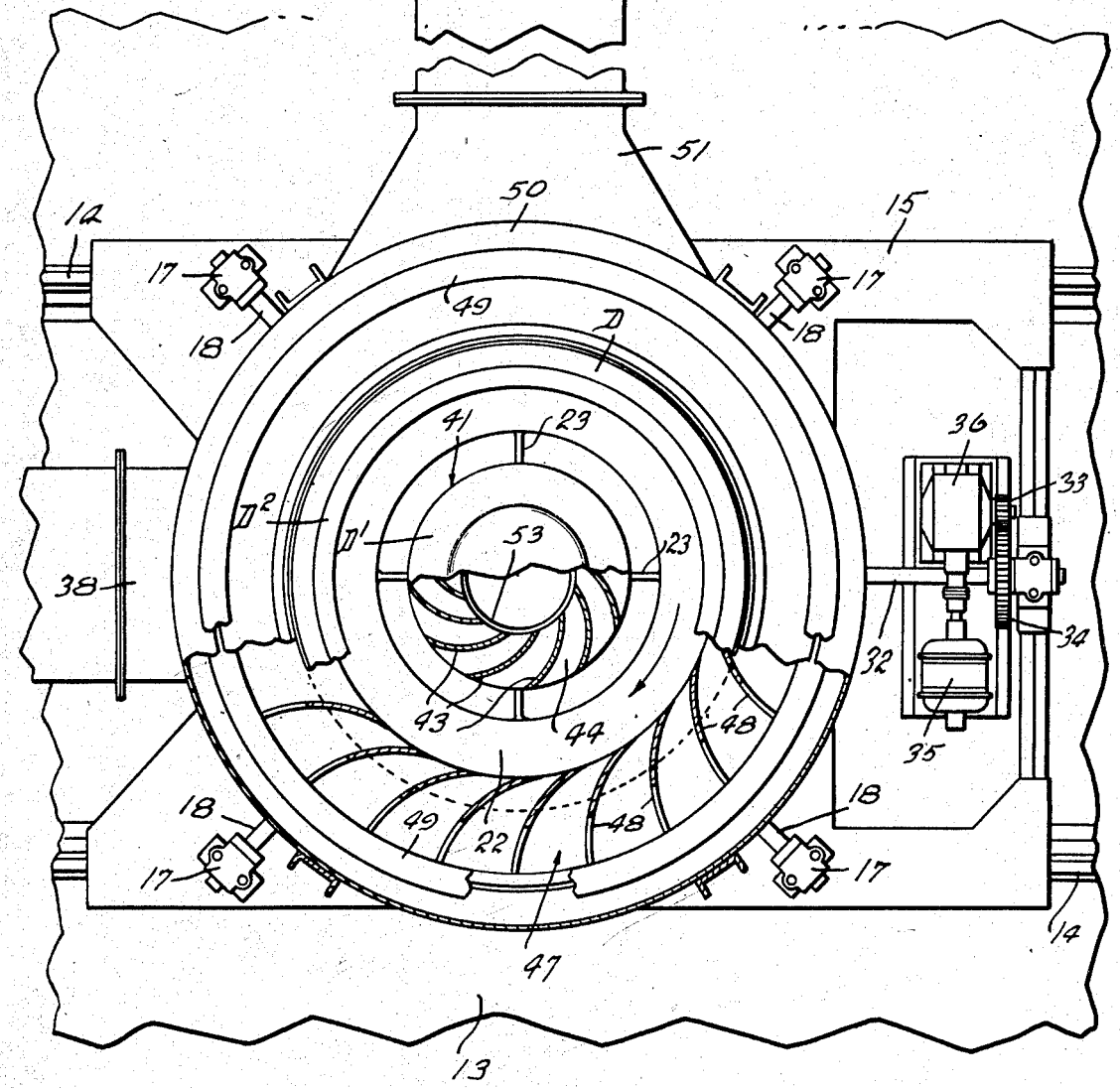

Other objects will be in part apparent and in part pointed out hereinafter in connection with the accompanying drawings, wherein: Fig. 1 is a vertical sectional view taken through a device embodying the invention, the clinker forming kiln being shown fragmentarily; Fig. 2 is substantially an end elevation of the device shown in Fig. 1 looking from right to left, the hood or transition piece connecting the kiln and clinker cooler being shown in section; Fig. 3 is a plan section corresponding substantially to the line 3—3 of Fig. 1; Fig. 4 is a plan section corresponding substantially to the line 4—4 of Fig. 1 and having parts broken away to show the construction of the inlet and outlet baffles; Fig. 5 is a view similar to Fig. 1, being a vertical sectional view of a modified form of the invention; Fig. 6 is substantially an end elevation looking from right to left in Fig. 5, the hood or transition piece between the kiln and clinker cooler being shown in section as in Fig. 2; Fig. 7 is a plan section corresponding substantially to the line 7—7 of Fig. 5 and having parts broken away to show the construction at different levels, and Fig. 8 is a plan section corresponding substantially to the line 8—8 of Fig. 5 and having parts broken away to show the construction of the inlet and outlet baffles.

Referring now to the accompanying drawings, corresponding parts being indicated by the same characters in the several views, two illustrative embodiments of the invention will be described, the first embodiment being described with reference to Figs. 1 to 4 inclusive, while the alternate or modified form is described with reference to Figs. 5 to 8 inclusive.

General construction and operation

The clinker forming kiln, indicated generally by the reference character A may be of the variety conventional in cement manufacture, that is, a substantially horizontal, rotary, internally fired kiln provided with suitable heat resistant lining and fired through a fuel pipe B with any suitable fuel such as liquid hydrocarbon material, powdered coal, or the like. Communicating with the delivery end of the kiln A is a fixed hood or transition piece C which opens downwardly into a clinker cooling device indicated generally by the reference character D. The cooling device D is provided with inner and outer parts $D^1$ and $D^2$. One of these parts is rotatable whereby to cause the clinkers to settle rapidly into a uniformly distributed mass in the annular space formed therebetween and it is preferred to have an inlet for cold air in one of these parts and an outlet for a portion of such air in the other part. This, however, is not absolutely essential and the invention in its broader aspects contemplates structures wherein both inlet and outlet may be in either the inner or the outer part. That part which is rotatable is provided with a horizontal, annular shelf indicated in Figs. 1 to 4 inclusive by the reference hereinafter E, and in Figs. 5 to 8 inclusive as E¹. The outer part will in each case terminate a short distance above this shelf whereby cooled clinkers will be delivered upon such shelf. The clinkers will be removed therefrom by suitable mechanism hereinafter to be described in connection with each form of the invention. In each case, the air outlet is provided with suitable damper means whereby the relative amounts of air passing through such outlet means and to the kiln can be regulated. Such damper means preferably will be located at a substantial distance from the heated zone whereby not to be affected by the heat. It will be noted that in each form of the invention, the cooling device is mounted on a track whereby to be moved from proximity to the kiln for ready access to the less durable parts for the purpose of making repairs. It is also within the contemplation of the invention to make the hood or transition piece C movable with respect to the kiln and the cooler for the same purpose and omitting the movable feature of the cooling device.

Form of Figs. 1 to 4

Referring now to Figs. 1 to 4 inclusive, the kiln A is mounted on suitable supports (not shown) and the hood C is mounted on the floor 10, being provided with suitable rollers 11 cooperating with tracks 12 on such floor. At a lower level is a suitable supporting surface 13 upon which are mounted tracks 14 forming a support for a carriage 15 provided with wheels 16 and upon which the cooling mechanism is mounted. Supported on the carriage 15 by suitable journals 17 are a plurality of shafts 18 each of which carries at its inner end a flanged roller 19. The rollers 19 form a support for the rotatable part D² of the cooling mechanism, such rollers being contacted by an annular bearing track 20 carried by such rotatable part D², specifically by a gear 21 on which is supported a lower shell 22. The shell 22 is attached by means of webs 23 to a sleeve 24 which is integral with the shell E. Surrounding the lower edge of the shell 22 is a vertically adjustable sleeve 25 forming a control for the delivery of cooled clinkers upon the shelf E.

Also mounted upon the gear 21 and extending vertically upwardly therefrom is a shell 26, immediately within which I provide a heat resistant lining 27 composed of fire brick or the like. It will be noted that the upper edge of the wall made up by the elements 26 and 27 is in registration with the bottom opening in the hood or transition piece C, which is of similar fire resistant construction.

Mounted upon the carriage 15 is a shaft 28 carrying a bevel gear 29 and a pinion 30 meshing with the gear 21. Meshing with the bevel gear 29 is a bevel pinion 31 carried by shaft 32 also mounted on the carriage 15 and carrying a gear 33. The gear 33 is driven by pinion 34 which is in turn driven by a motor 35 through the medium of a gear reduction device 36.

Air circulation

Supported by suitable straps 37 from the carriage 15 is an air inlet conduit 38 to the upper surface of which is secured an annular element 39 in contact with which the sleeve 24 rotates and to which is secured in any suitable manner an inner sleeve 40 extending upwardly to, joining with and providing a support for an air inlet device forming the upper portion of the inner part D¹. This terminal portion of the air inlet is constructed in upper and lower sections 41 and 42, each of which is provided with downwardly extending parts defined between walls 43, such walls 43 being spaced apart by spacing baffles 44 shaped as most clearly seen in Fig. 4. Air entering the sleeve 40 through the conduit 38, under the influence of any suitable air impelling means such as a motor driven fan 45 passes through the upper and lower inlet sections into the annular space between the inner and outer parts D¹ and D². The volume or pressure of the air may be controlled either by the speed of the air impelling device or by damper means 46, or both, as convenient.

Passing through the outer, rotatable part D² is an outlet port 47 provided with spacing baffles 48 similar to those 44 and of reverse curvature as best seen in Fig. 4. In operation the baffles 44 are fixed while the baffles 48 rotate in the direction of the arrow in Fig. 4 whereby the clinker bed is caused to rotate, although at a lower speed than the element D². Thus there is relative motion between the clinker bed and both the inlet and outlet baffles and the curvature of baffles in such, as will be evident from Fig. 4, that they will tend always to urge or feed the clinkers into the annular space between the inner and outer parts, and thus absolutely prevent the passage of any clinkers from such annular space either into the air inlet or through the air outlet. A further means tending to prevent undesirable passage of clinkers into the air conduits is the downward slope of both inlet and outlet ports toward the clinker containing space. Thus there is gravitational resistance provided to co-act with the curved baffles for retaining the clinkers in the proper space. The outlet ports are in communication with an annular conduit surrounding the part D² and may be of annular portions 49 rotatable with the shell 26 and the fixed portion 50 communicating with an outlet conduit 51 provided with a controlling damper 52. It will be obvious that if the damper 52 is entirely closed no air can escape through the outlet ports 47 and all air forced into the cooler will necessarily pass upwardly into the kiln, it being understood that the joints between relatively movable parts are equipped with any suitable air seals to prevent escape of any substantial quantity of air except to the kiln for the purpose of supporting combustion and through the outlet conduit 51 past the controlling damper 52. It will be apparent from the foregoing and from the drawings that two more or less distinct air paths are provided, namely 1, from the upper inlet section, through the upper portion of the clinker bed and into the kiln, and 2, from the lower inlet section through a partially cooled portion of clinkers and out through the outlet conduit 51. It may be desirable to cause all the air to be delivered through the lower inlet section and a portion thereof to pass through all of the highly heated portion of the clinker bed so as to provide exceptionally highly heated air for supporting combustion in the kiln. With this end in view, I provide an adjustable sleeve 53 within the space between the upper and lower inlet sections and capable of being moved upwardly a distance to cut off all of the upper outlet section except such quantity as may be required for cooling thereof. It is, however, generally desirable not to use this sleeve since the objective of extremely rapid cooling of the clinkers usually outweighs the desirability of extremely highly heated air for combustion.

The mechanism for removal of clinkers from the shelf E may take the form of a fixed plow 54 having a portion terminating in close proximity to the upper surface of the shelf E whereby the clinkers will be caused to ride over the edge of such shelf and be delivered to a suitable chute 55 and thence upon a conveyor 56.

Modified form of Figs. 5 to 8

In Figs. 5 to 8 inclusive, I have shown a modified form of the invention wherein the outer part $D^2$ is fixed and the inner part $D^1$ is rotatable and wherein there is provided also an auxiliary air inlet through the outer part. In this form of the invention, I provide tracks 57 upon which the cooling device is movably mounted by means of a carriage 58 carrying suitable wheels 59 cooperating with such track. Journaled in suitable bearings 60 carried by the carriage 58 are shafts 61 each of which carries at its inner end a flanged roller 62 providing a support for the rotatable inner part $D^1$ through the medium of an annulus 63 carried by an annular gear 64 secured to the bottom of the shelf $E^1$. Meshing with the gear 64 is a pinion 65 carried by shaft 66 journaled in suitable bearings 67 carried by the carriage 58. The shaft 66 also carries a gear 69 which is driven from a pinion 70 by a motor 71 through the medium of a gear reduction mechanism 72. The gear 64 and shelf $E^1$ transmit rotation to the sleeve 73 which is in substantially sealed communication with inlet conduit 74. The sleeve 73 carries at its upper end upper and lower inlet sections made up of spaced wall elements 75 held in spaced relation to each other by inlet baffles 76 which are curved in like manner to the baffles 44 in the first described form of the invention. In this form as well as the first described form there is provided on the upper surface of the uppermost wall 75 a heat protective covering of suitable fire resistant material such as carborundum or the like. The construction of these air inlet ports and baffles is in all respects similar to that in the first described form of the invention with the exception that the curvature is so to speak in the opposite direction. The curvature is however in the same direction relative to the motion of the clinker bed and performs the same function of preventing passage of clinkers into the air conduits.

Mounted on the carriage 58 and extending upwardly therefrom are supports 77 to which is attached a shell 78 provided with fire resistant lining 79 and forming the outer wall of an annular clinker receiving space. Also supported by the supports 77 is a lower shell portion 80 with a vertical flange 81 with which an adjustable controlling ring 82 cooperates. The lowermost edge of the element 82 is spaced above the shelf $E^1$ and received within and spaced relative to an upwardly and outwardly extending flange 83. The clinkers delivered on the shelf $E^1$ ride over the edge of the flange 83 and are delivered upon an outer portion of the shelf $E^1$ and finally removed therefrom by a plow 84 and delivered into a suitable hopper 85 and to a conveyor in like manner as described in connection with the first form of the invention.

Formed in the wall made up of the elements 78 and 79 is an outlet port 86 provided with spacing baffles 87 curved in reverse direction to the baffles 86 as most clearly seen in Fig. 8. The port 86 is in communication with an annular conduit 88 which in turn communicates with the conduit portion 89 provided with a damper 90 for controlling flow of air therethrough and consequently regulating the amount of air which is compelled to pass upwardly through the clinker bed into the kiln A. In this form of the invention, I may provide a sleeve 96 corresponding to the sleeve 53 in the first described form and serving the same purpose. In this form of the invention I employ a branch passage or auxiliary conduit 91, provided with a suitable damper 92 and communicating through a port 93 with the space defined between the inner and outer parts $D^1$ and $D^2$. It is to be understood that the inlet port 93 is to be provided with curved baffles similar to those 87 but that the inlet 93 will be preferably of less circumferential extent than the port 86. Cooling air may be passed through the conduit 74 under the influence of a motor driven blower 94 and may be controlled by means of a suitable damper 95 or by regulating the speed of the blower 94.

In this form of the invention as well as in the first described form the various joints between the relatively rotatable parts may be provided with conventional air seals, and in most forms equivalent mechanical movements may be substituted for those shown and described. From the foregoing description and from the accompanying drawings it will be obvious that I have provided a device which is well adapted for its intended purpose and while I have shown and described in detail two embodiments in which the invention may be realized, I do not wish to be limited to the details of the disclosure but only in accordance with the appended claims.

Having thus described my invention, what I claim is:

1. In a machine of the character described, in combination with an internally fired kiln, means for cooling clinkers delivered from said kiln and supplying heated air for combustion of fuel therein, said means comprising fixed and rotatable parts, one within the other, together defining an annular space for receiving clinkers from said kiln, said receptacle communicating with said kiln, means carried by and cooperating with said parts for causing clinkers to form a uniformly distributed mass or bed in said space, means for continuously removing clinkers from a lower portion of said space, means for forcing air through a bed of clinkers in said space, an air outlet from said space other than to said kiln and means adjustably controlling the flow of air from said outlet whereby a greater or lesser proportion of the air passing through said bed of clinkers may be caused to enter the kiln.

2. In a machine of the character described, in combination with an internally fired kiln, means for cooling clinkers delivered from said kiln and supplying heated air for combustion of fuel therein, said means comprising fixed and rotatable parts, one within the other, together defining an annular space for receiving clinkers from said kiln, said receptacle communicating with said kiln, means carried by and communicating with said parts for causing clinkers to form a uniformly distributed mass or bed in said space, means for continuously removing clinkers from a lower portion of said space, means for forcing air through said bed of clinkers in said space, an air outlet from said space other than to said kiln and means adjustably controlling the flow of air from said outlet whereby a greater or lesser proportion of the air passing through said bed of clinkers may be caused to enter the kiln, said outlet being located intermediate the upper and lower ends of said space whereby air escaping therethrough may pass through a partially cooled portion of the clinker bed and escape without traversing the hottest portion thereof.

3. In a device of the class described, in combination with a clinker forming kiln, a receptacle in communication with said kiln and adapted to receive clinkers therefrom, means including said receptacle for maintaining a bed of clinkers in said receptacle upon the top of which clinkers from said kiln may fall, means for removing clinkers from a lower portion of said bed, means for forcing air counter-flow through the upper surface of the bed of clinkers in said receptacle, an outlet from said receptacle other than to said kiln and below the upper surface of said bed of clinkers, and means associated with said outlet for adjustably controlling passage of air through said outlet whereby to govern the proportion of air passing to said kiln.

4. In a device of the class described, in combination with a clinker forming kiln, a clinker cooling device, comprising, inner and outer parts, one thereof being rotatable, defining an annular clinker receiving compartment in communication with said kiln, air inlet means to said annular compartment formed in one of said parts, air outlet means from said annular compartment formed in one of said parts, means remote from said compartment adjustably controlling passage of air through said outlet and means for removing cooled clinkers from said compartment.

5. In the combination recited in claim 3, said air circulating means including an air inlet adapted to deliver cold air into the interior of the bed of clinkers, and said outlet being adjacent the outside of said clinker bed.

6. In the combination recited in claim 3, said first means including an air inlet, the same being divided into vertically separated upper and lower parts and said outlet being located below the said upper part of said inlet whereby cooling air from said upper part may pass mainly through a relatively hot upper portion of said clinker bed to said kiln and cooling air from said lower part may pass mainly through a partially cooled lower portion of said clinker bed to said outlet.

7. In combination with a clinker forming kiln, a clinker cooling device comprising inner and outer parts, one thereof being rotatable, defining between them a vertically extending annular clinker receiving and cooling compartment, inlet means, for cooling air formed in one of said parts intermediate the upper and lower ends thereof, and outlet means for such air formed in the other of said parts intermediate the upper and lower ends thereof, means for controlling the flow of air through said outlet means and means responsive to rotation of one of said parts for removing cooled clinkers from said compartment.

8. The combination recited in claim 7, characterized in that said inlet means and said outlet means are provided with radially and circumferentially extending baffles inclined in a direction to have a tendency to feed the clinkers into said annular compartment whereby to prevent passage of clinkers therethrough out of said compartment.

9. The combination recited in claim 7, characterized in that said inlet means and said outlet means are provided with radially and circumferentially extending baffles inclined in a direction to have a tendency to feed the clinkers into said annular compartment whereby to prevent passage of clinkers therethrough out of said compartment, the ends of said baffles most remote from said compartment being higher than the ends adjacent thereto, whereby to present gravitational resistance to passage of clinkers therethrough from said compartment.

10. In the combination recited in claim 4, said outlet means being located below said inlet means whereby a portion of the cooling-air from said inlet means may pass upwardly through the hottest portion of clinkers in said annular compartment and a portion of said cooling-air may pass downwardly through a partially cooled portion of clinkers.

11. In the combination recited in claim 4, said outlet means being located below said inlet means whereby a portion of the cooling-air from said inlet means may pass upwardly through the hottest portion of clinkers in said annular compartment and a portion of said cooling-air may pass downwardly through a partially cooled portion of clinkers, said outer part being rotatable and including a shelf, means defining an adjustable opening between said shelf and an upper portion of said rotatable part and fixed means for removing cooled clinkers from said shelf.

12. In a device of the class described, in combination, a carriage, a clinker cooling device mounted thereon, a clinker forming kiln having its delivery end mounted above and in communication with said cooling device, and means for forcing air through said cooling device, said cooling device comprising inner and outer parts one thereof being rotatable and carrying an annular shelf upon which the cooled clinkers are delivered, the outer part having at its lower end a delivery opening adjacent said shelf, means fixed with respect to said carriage for removing clinkers from said shelf, one of said parts having air inlet means formed therein and one of said parts having air outlet means formed therein, said air outlet means being so positioned as to provide an air path through partially cooled clinkers only.

13. In a device of the class described, clinker cooling means comprising, in combination, inner and outer parts defining therebetween a clinker receiving space adapted to receive clinkers from a continuously operating kiln, one thereof being rotatable whereby to cause clinkers to be uniformly distributed, said inner part having an air inlet passage formed therein and provided with one or more openings for delivery of air into said space intermediate the upper and lower ends thereof, and means providing for continuous delivery of clinkers from a lower part of said space at a rate to maintain a substantially constant level bed of clinkers in said space and filling the same from a point above said air inlet passage downwardly.

14. In a device of the class described, clinker cooling means comprising, in combination, inner and outer parts defining therebetween a clinker receiving space, one thereof being rotatable whereby to cause clinkers to be uniformly distributed, said inner part having an air inlet passage formed therein and provided with one or more openings for delivery of air into said space intermediate the upper and lower ends thereof and means providing for continuous delivery of clinkers from a lower part of said space at a rate to maintain a substantially constant level bed of clinkers in said space and filling the same to a level above said air inlet passage, said outer part being provided with an outlet opening intermediate its ends adapted to exhaust a portion of the air admitted through said inner part.

15. A clinker cooling mechanism, comprising, in combination, means for maintaining a clinker bed by continuously adding hot clinker to the top of a clinker bed and continuously removing clinker from the bottom thereof, means for supplying cooling air to said clinker bed at at least two elevations, and means causing the major portion of air supplied at the uppermost elevation to emerge from said clinker bed at the top thereof and the air admitted at a lower elevation to emerge below the top of the clinker bed.

16. Process comprising forming a bed of clinker, continuously adding hot clinker from a kiln to the top thereof and withdrawing cooled clinker from the bottom thereof, continuously circulating cooling air therethrough, a portion of the cooling air being caused to emerge from said bed at the top thereof and the remainder therebelow, controlling the portion of air emerging from the top of said bed with respect to the requirements of the kiln for secondary combustion air and utilizing the same in said kiln as secondary combustion air.

17. Process comprising forming a bed of clinker, continuously adding hot clinker from a kiln to the upper portion thereof and withdrawing cooled clinker from a lower portion thereof, circulating cooling air through said bed of clinker, a portion of such cooling air being caused to circulate through the upper portion only of said bed and pass to the kiln and the remainder being caused to circulate through a lower portion only of said bed and controlling the magnitude of said first portion with respect to the requirements of said kiln for secondary combustion air.

18. A process comprising forming a mass of clinkers, continuously adding hot clinker from a kiln to the top thereof and continuously removing clinker from the bottom thereof, supplying cooling air to said mass at a point intermediate the upper and lower ends thereof, causing such cooling air to divide and a part thereof to flow upwardly in contact with the hottest portion of said clinker bed and pass to said kiln while another part flows in contact with a partially cooled portion of said clinker bed and escapes to a point other than to said kiln, controlling the relative proportions of said cooling air by means of the back pressures retarding its flow, the back pressure retarding escape other than to said kiln being adjusted to control the flow of air to said kiln with respect to the requirements of said kiln for secondary combustion air, and utilizing the highly heated portion of cooling air flowing to said kiln as secondary combustion air therefor.

CLIFTON N. WINDECKER.